US009890931B2

(12) United States Patent
Clark

(10) Patent No.: US 9,890,931 B2
(45) Date of Patent: Feb. 13, 2018

(54) CONTROL DEVICE FOR SOLID STATE LIGHTING FIXTURES

(71) Applicant: Hubbell Incorporated, Shelton, CT (US)

(72) Inventor: Adam Joseph Clark, Bradenton, FL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/142,735

(22) Filed: Apr. 29, 2016

(65) Prior Publication Data

US 2016/0323951 A1    Nov. 3, 2016

Related U.S. Application Data

(60) Provisional application No. 62/155,264, filed on Apr. 30, 2015, provisional application No. 62/155,166, (Continued)

(51) Int. Cl.
| | |
|---|---|
| *H05B 37/02* | (2006.01) |
| *F21V 15/01* | (2006.01) |
| *F21V 23/00* | (2015.01) |
| *F21V 23/04* | (2006.01) |
| *H05B 33/08* | (2006.01) |
| *F21V 29/77* | (2015.01) |
| *F21V 21/116* | (2006.01) |
| *F21V 21/30* | (2006.01) |
| *F21S 8/04* | (2006.01) |
| *H02J 9/06* | (2006.01) |
| *F21Y 115/10* | (2016.01) |

(52) U.S. Cl.
CPC .............. *F21V 15/01* (2013.01); *F21S 8/046* (2013.01); *F21V 21/116* (2013.01); *F21V 21/30* (2013.01); *F21V 23/007* (2013.01); *F21V 23/008* (2013.01); *F21V 23/04* (2013.01); *F21V 23/0435* (2013.01); *F21V 29/77* (2015.01); *H02J 9/06* (2013.01); *H05B 33/0803* (2013.01); *H05B 33/0809* (2013.01); *H05B 33/0845* (2013.01); *H05B 33/0851* (2013.01); *H05B 33/0854* (2013.01); *H05B 33/0866* (2013.01); *H05B 37/0272* (2013.01); *H05B 37/0281* (2013.01); *F21Y 2115/10* (2016.08)

(58) Field of Classification Search
CPC ............ H05B 33/0845; H05B 37/0281; H01H 11/0018; H01H 9/02711
USPC ........................................................ 315/297
See application file for complete search history.

(56) References Cited

U.S. PATENT DOCUMENTS

| | | | |
|---|---|---|---|
| 4,147,961 A | 4/1979 | Elms | |
| 2006/0250745 A1* | 11/2006 | Butler | ................ H05B 37/0281 361/160 |

(Continued)

OTHER PUBLICATIONS

PCT International Search Report and Written Opinion dated Jul. 29, 2016 from corresponding Application No. PCT/US16/30134, 16 pages.

*Primary Examiner* — Don Le
(74) *Attorney, Agent, or Firm* — Dilworth IP LLC

(57) ABSTRACT

The present disclosure provides a control device for solid state lighting fixtures. The control device is programmable and is configured to adjust the intensity of light emitted by solid state lighting fixtures. The control device includes a housing assembly and a programmable controller.

16 Claims, 9 Drawing Sheets

Related U.S. Application Data filed on Apr. 30, 2015, provisional application No. 62/155,293, filed on Apr. 30, 2015, provisional application No. 62/156,251, filed on May 2, 2015.

(56) References Cited

U.S. PATENT DOCUMENTS

| | | | |
|---|---|---|---|
| 2009/0218960 A1 | 9/2009 | Lyons et al. | |
| 2009/0278479 A1* | 11/2009 | Platner | H05B 37/0245 |
| | | | 315/312 |
| 2011/0062888 A1* | 3/2011 | Bondy | H05B 33/0815 |
| | | | 315/294 |
| 2012/0299498 A1* | 11/2012 | Quaal | H05B 37/0227 |
| | | | 315/210 |
| 2012/0306375 A1 | 12/2012 | Van de Ven | |
| 2013/0038218 A1* | 2/2013 | Xu | G05B 15/02 |
| | | | 315/151 |
| 2013/0140430 A1 | 6/2013 | Roberts | |
| 2013/0293112 A1* | 11/2013 | Reed | H05B 37/0272 |
| | | | 315/131 |
| 2015/0085475 A1 | 3/2015 | Ryu et al. | |
| 2016/0241823 A1* | 8/2016 | Blaser, Jr. | H04N 9/3144 |
| 2016/0323980 A1* | 11/2016 | Weber | H05B 37/0272 |
| 2017/0093210 A1* | 3/2017 | Recker | H02J 9/061 |

* cited by examiner

900

| Routine Number | Switch 1 | Switch 2 | Switch 3 | Switch 4 | Switch 5 | Brightness % | Delay (Hrs) | Variable Delay Estimated Time |
|---|---|---|---|---|---|---|---|---|
| 01 | 0 | 0 | 0 | 0 | 0 | 100 | 0 | |
| 02 | 1 | 0 | 0 | 0 | 0 | 20 | 0 | |
| 03 | 0 | 1 | 0 | 0 | 0 | 20 | 3 | |
| 04 | 1 | 1 | 0 | 0 | 0 | 20 | 5 | |
| 05 | 0 | 0 | 1 | 0 | 0 | 20 | 7 | |
| 06 | 1 | 0 | 1 | 0 | 0 | 20 | 9 | |
| 07 | 0 | 1 | 1 | 0 | 0 | 40 | 0 | |
| 08 | 1 | 1 | 1 | 0 | 0 | 40 | 3 | |
| 09 | 0 | 0 | 0 | 1 | 0 | 40 | 5 | |
| 10 | 1 | 0 | 0 | 1 | 0 | 40 | 7 | |
| 11 | 0 | 1 | 0 | 1 | 0 | 40 | 9 | |
| 12 | 1 | 1 | 0 | 1 | 0 | 60 | 0 | |
| 13 | 0 | 0 | 1 | 1 | 0 | 60 | 3 | |
| 14 | 1 | 0 | 1 | 1 | 0 | 60 | 5 | |
| 15 | 0 | 1 | 1 | 1 | 0 | 60 | 7 | |
| 16 | 1 | 1 | 1 | 1 | 0 | 60 | 9 | |
| 17 | 0 | 0 | 0 | 0 | 1 | 20 | | 6:00 pm |
| 18 | 1 | 0 | 0 | 0 | 1 | 20 | | 8:00 pm |
| 19 | 0 | 1 | 0 | 0 | 1 | 20 | | 10:00 pm |
| 20 | 1 | 1 | 0 | 0 | 1 | 20 | | 12:00 am |
| 21 | 0 | 0 | 1 | 0 | 1 | 20 | | 2:00 am |
| 22 | 1 | 0 | 1 | 0 | 1 | 40 | | 6:00 pm |
| 23 | 0 | 1 | 1 | 0 | 1 | 40 | | 8:00 pm |
| 24 | 1 | 1 | 1 | 0 | 1 | 40 | | 10:00 pm |
| 25 | 0 | 0 | 0 | 1 | 1 | 40 | | 12:00 am |
| 26 | 1 | 0 | 0 | 1 | 1 | 40 | | 2:00 am |
| 27 | 0 | 1 | 0 | 1 | 1 | 40 | | 4:00 am |
| 28 | 1 | 1 | 0 | 1 | 1 | 60 | | 6:00 pm |
| 29 | 0 | 0 | 1 | 1 | 1 | 60 | | 8:00 pm |
| 30 | 1 | 0 | 1 | 1 | 1 | 60 | | 10:00 pm |
| 31 | 0 | 1 | 1 | 1 | 1 | 60 | | 12:00 am |
| 32 | 1 | 1 | 1 | 1 | 1 | 60 | | 2:00 am |

*Fig. 9*

CONTROL DEVICE FOR SOLID STATE LIGHTING FIXTURES

CROSS-REFERENCE TO RELATED APPLICATIONS

This application claims priority to U.S. Provisional Application No. 62/155,264, filed on Apr. 30, 2015, titled "Flexible Housing Assembly for SSL Light Fixtures," U.S. Provisional Application No. 62/155,166, filed on Apr. 30, 2015, titled "Solid State Light Fixtures with Integrated Controls," U.S. Provisional Application No. 62/155,293, filed on Apr. 30, 2015, titled "Control Device for Solid State Light Fixtures," and U.S. Provisional Application No. 62/156,251, filed on May 2, 2015, titled "Solid State Lighting Fixtures," all of which are hereby incorporated herein by reference in their entireties.

BACKGROUND

Field

The present disclosure relates to control devices for solid state lighting fixtures, and more particularly, to programmable control devices for adjusting the intensity of light emitted by solid state lighting fixtures.

Description of the Related Art

Luminaires (light fixtures) utilizing light emitting diodes (LEDs) have in recent years become somewhat practical and continue to penetrate the lighting market due to the increased luminous efficacy of commercially available LED components. LED luminaires are desirable as they offer customers energy savings due to good luminous efficacy combined with the ability to precisely control light distribution patterns, which is of particular importance for certain lighting scenarios, such as outdoor environments. Another benefit of LED luminaires is that with the right control mechanism the LEDs are controllable. Each LED luminaire can start-up (i.e., illuminate) on a near-instantaneous basis and may be dimmed to any level within the driver's operational range by varying the current through each LED via dimming drivers, e.g. power supplies, that offer dimming leads accepting the standard 0-10V input format.

Further energy savings of LED luminaires can be realized by providing light only where and when needed. For example, LED luminaires can be dimmed or turned off until motion is detected in an area. The LED luminaires can also be dimmed according to a time of day, or set to illuminate at full brightness from dusk through midnight or another time, and then dimmed, saving energy, but still providing an acceptable level of lighting for overnight security purposes. Selective dimming or on/off operation of LED luminaires also retards lumen depreciation and extends the service life of the LED luminaires.

SUMMARY

The present disclosure provides control devices for solid state lighting fixtures. The control device is programmable and generates output signals that can be provided to a dimming input of an SSL driver that can adjust the intensity of light (visible and non-visible) emitted by solid state lighting fixtures. In one embodiment, the control device includes a housing and a programmable controller. The housing has a switch assembly window providing access to an interior of the housing, and a connector aperture providing access to an interior of the housing. The programmable controller is positioned within the housing and includes a connector accessible through the connector aperture and a switch assembly accessible through the switch assembly window. The programmable controller generates one or more dimming signals defining a programmed function capable of controlling an SSL driver.

The present disclosure also provides solid state lighting (SSL) fixtures with the control device disclosed herein. In one embodiment the SSL light fixture includes an SSL light engine, a control device, and an SSL driver. The SSL light engine has one or more SSL elements configured to illuminate a desired area. The control device includes a housing having a switch assembly window providing access to an interior of the housing and a connector aperture providing access to an interior of the housing, a programmable controller within the housing and having a connector accessible through the connector aperture and a switch assembly accessible through the switch assembly window, wherein the programmable controller generates one or more dimming signals defining a programmed function capable of controlling an SSL driver. The SSL driver supplies power to the SSL light engine and the control device, and receives from the control device the one or more dimming signals that controls illumination of the SSL light engine.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 9 is a table representing switch assembly settings and corresponding control device operations according to an exemplary embodiment of the present disclosure;

DETAILED DESCRIPTION

Figure 1:
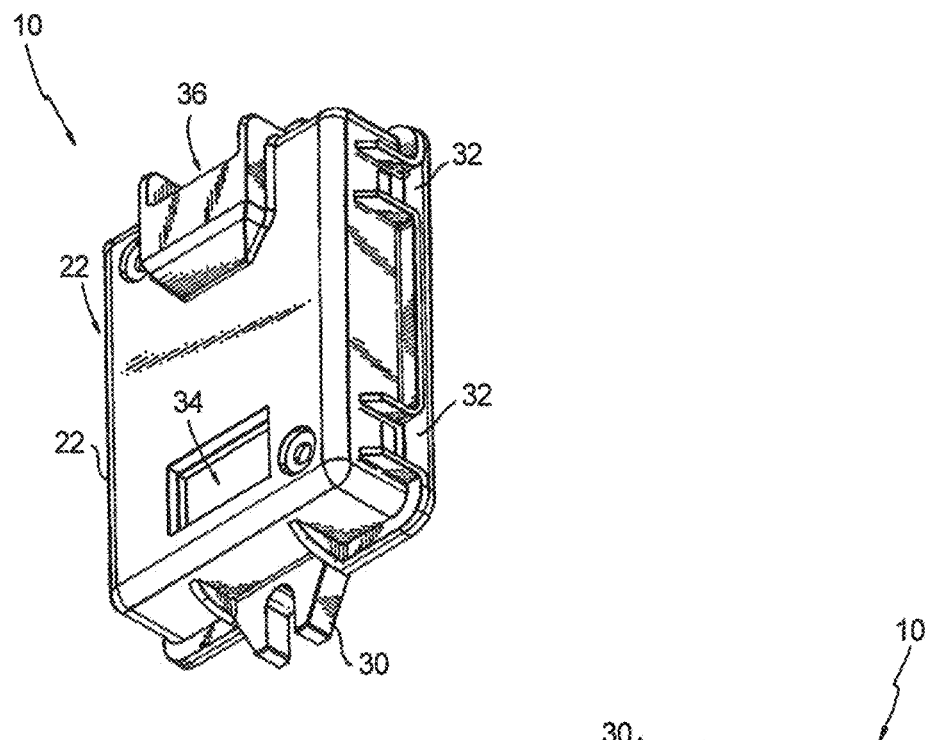
FIG. 1 is a perspective view of an exemplary embodiment of a control device for solid state lighting fixtures according to the present disclosure.
Figure 2:
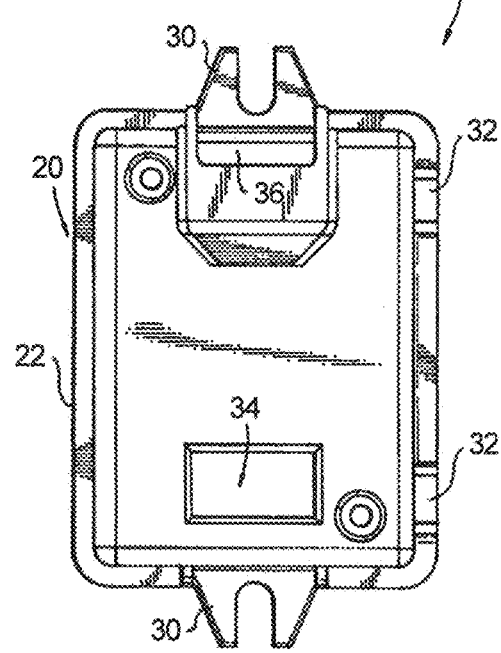
FIG. 2 is a front plan view of the control device of FIG. 1.

The present disclosure provides control devices for solid state lighting fixtures. The control device is programmable and generates output signals that can be provided to a dimming input of an SSL driver that can adjust the intensity of light (visible and non-visible) emitted by solid state lighting fixtures. Referring to FIGS. 1-7, various views of a control device for solid state lighting (SSL) fixture according to the present disclosure are shown. The control device 10 includes a housing assembly 20 and a controller 40 (seen in FIG. 3). In this exemplary embodiment, the housing assembly 20 has a main body 22 and a rear panel 24 that can be secured to the main body 22 via fasteners, such as screws 26 threaded into embedded nuts 28. The main body 22 is used to provide a mounting surface to connect the control device 10 to an SSL fixture, and acts as a protective outer shell to protect the controller 40 from the elements and/or damage. The main body 22 includes mounting brackets 30, a pair of cable tie fittings 32, a window 34 and a connector aperture 36. The mounting brackets 30 and/or cable tie fittings 32 can be used to mount the control device 10 to an SSL fixture or to cabling providing power to an SSL fixture. In the embodiment shown in FIGS. 1-7, the mounting brackets 30 are at the top and bottom of the main body 22, however, the mounting brackets 30 can be positioned along any portion of the main body. The window 34 provides access to a switch assembly 42 (seen in FIG. 7) that is part of the controller 40, and the connector aperture 36 provides access to a connector 44 (seen in FIG. 8) that is part of the controller 40, both of which will be described in more detail below. The main body 22 and rear panel 24 can be made of a thermoplastic material, such as polycarbonate, ABS or nylon, or metal, such as aluminum, die cast aluminum, stainless steel, galvanized steel or powder coated steel, or other rigid material to provide sufficient structural integrity for the controller 40.

Figure 3:
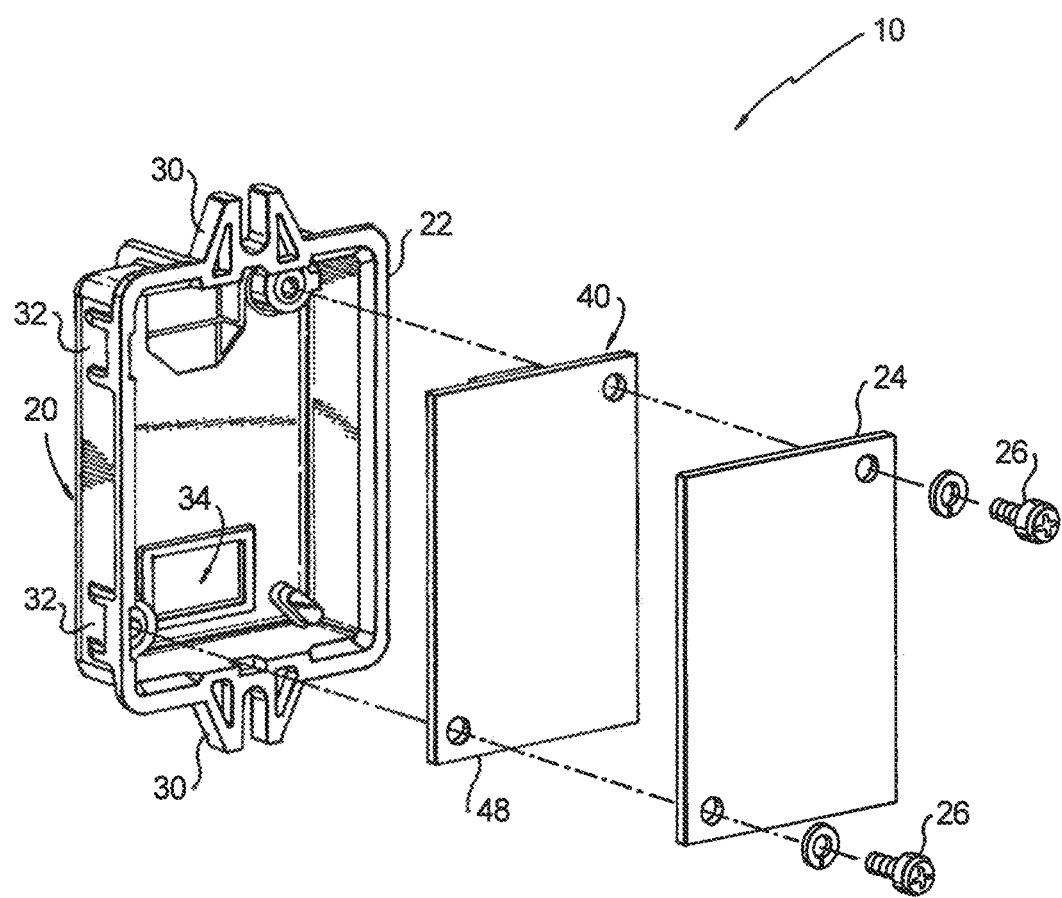
FIG. 3 is a perspective view with parts separated of the control device of FIG. 1.
Figure 4:
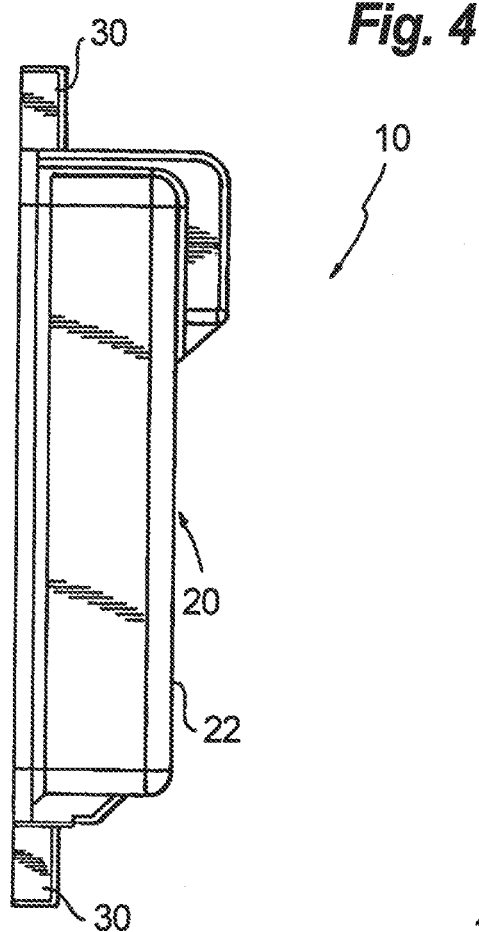
FIGS. 4-6 are side views of the control device of FIG. 1.
Figure 5:
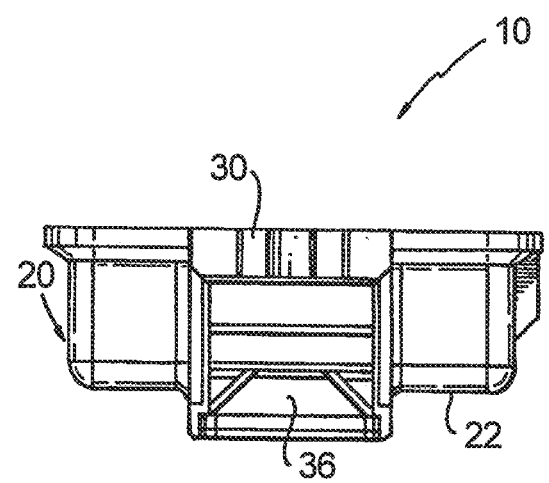
Figure 6:
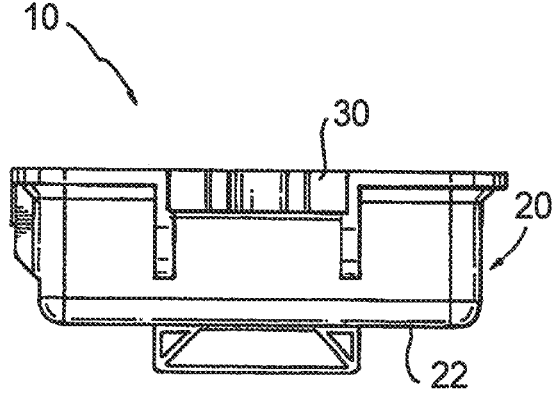
Figure 7:
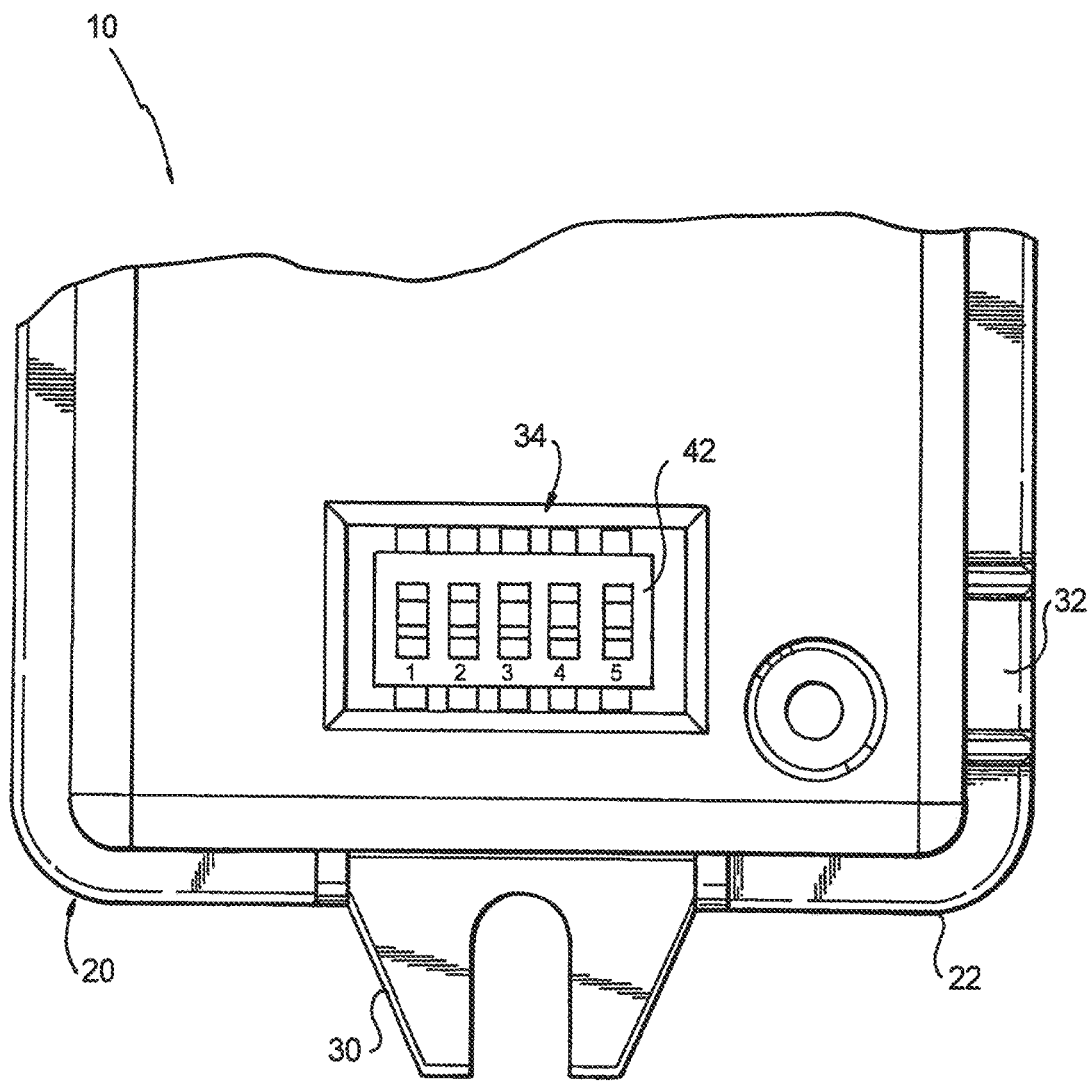
FIG. 7 is a partial front plan view of the control device of FIG. 1 illustrating a switch assembly for programming the control device.
Figure 8:
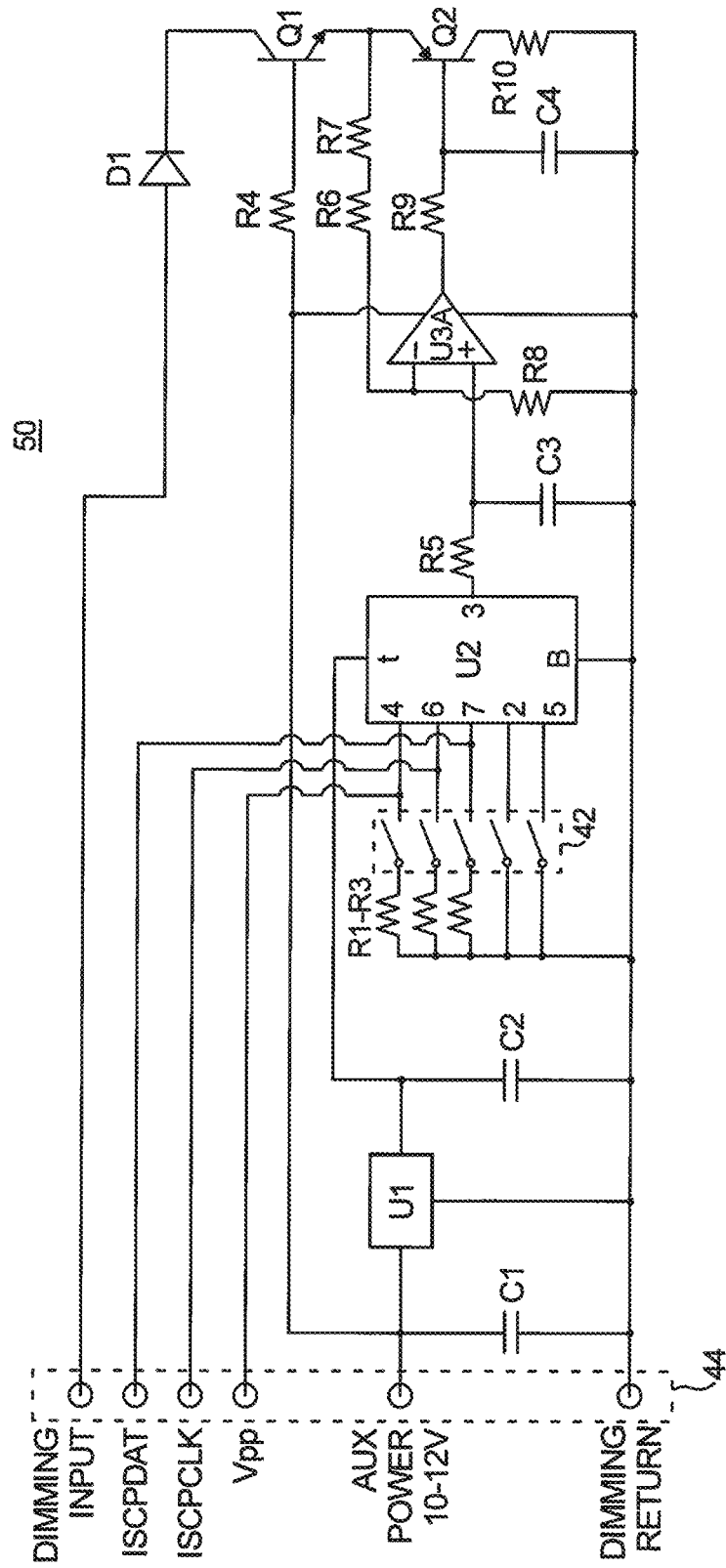
FIG. 8 is a circuit diagram for a controller within the control device of FIG. 1.

Referring to FIGS. 3 and 8, the controller 40 includes a switch assembly 42 and control circuitry 50 on a printed circuit board 48 that is secured within housing assembly 20 of the control device 10. A connector 44 may be used to electrically connect the controller 40 to external connections. In another embodiment wire leads may be soldered directly to the printed circuit board 48. The switch assembly 42 may be any component or combination of components capable of providing input to the microcontroller U2. An example of a suitable switch assembly 42 is the model 219-5MST-R, 5 position, DIP switch manufactured by CTS Corp. The connector 44 can be any connector capable of connecting wire leads from the control device 10 to an SSL driver, e.g., LED driver 120 shown in FIG. 14. An example of a suitable connector is the model 5025850670 right angle connector manufactured by Molex, Inc. The control circuitry 50 includes a voltage regulator U1 that regulates the DC power supplied to the controller 40, which is typically between 10-12 volts, to between about 3 volts and about 5 volts for supplying power to the control circuitry's components. Capacitor C1 filters the input voltage to the voltage regulator U1, and capacitor C2 filters the output voltage from the voltage regulator. The microcontroller U2 controls the operation of the controller 40. An example of a suitable microcontroller is the model PIC12F1840T-E/SN manufactured by Microchip Technology, Inc. The microcontroller U2 outputs a PWM signal, the duty cycle of which is proportional to the desired "dimming input" voltage. A low pass filter circuit comprised of resistor R5 and capacitor C3 converts the PWM signal to a DC voltage. The operational amp circuit drives an output circuit that includes transistors Q1 and Q2, diode D1, resistors R4, R6, R7 and R9, and capacitor C4. More specifically, the operational amp circuit drives transistor Q2, maintaining the voltage at the transistor's emitter at a multiple of the DC voltage output from the low pass filter and proportional to the PWM duty cycle. Overall, the output circuit comprises an open collector or current sinking circuit which sinks current from the driver's dimming input. Transistor Q1 is present to ensure that no current is conducted if power to the control device 10 is interrupted, thus defaulting the SSL fixture to full power for safety.

Figure 10:
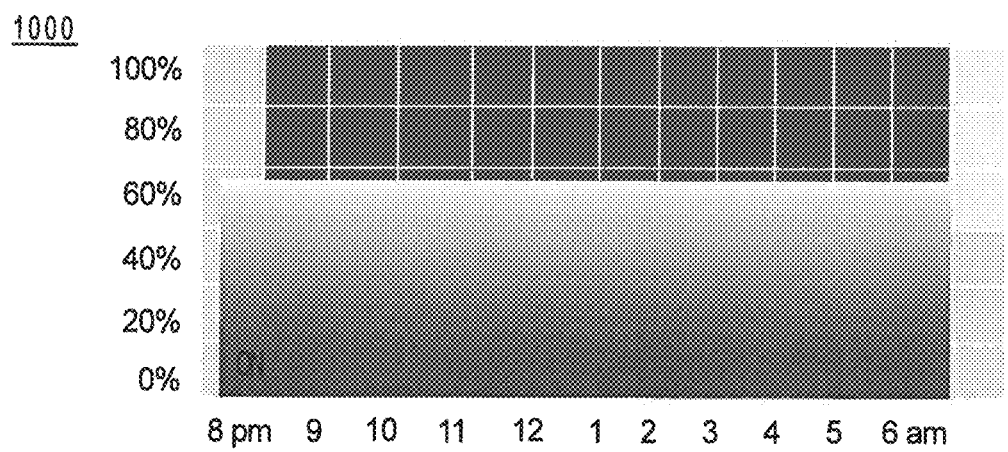
FIGS. 10-12 are graphs of the illumination intensity verse time for exemplary settings of the control device of FIG. 1.

The microcontroller U2 can be pre-programmed with functional settings (or routines) that define dimming brightness values and a time delays, and is responsive to the settings of the switch assembly 42. FIG. 9 provides a table of exemplary routine numbers (or functional settings) 900, switch assembly 42 settings and the function to be performed by the controller 40, which is provided as a dimming input signal. Examples of the function to be performed by the controller 40 include a brightness percentage setting, a delay time setting in hours, and variable time delay setting. Based on the routine number selected, the control device 10 can provide a number of dimming operations. Static dimming is not required to be limited to a specific period of time, but it can be. For example, the control device, under the control of the microcontroller U2, can provide static dimming if routines 1, 2, 7 or 12 are selected. With static dimming, the control device 10 can make an SSL fixture dim to 100%, 20%, 40%, or 60% brightness, respectively. It should be noted that selecting routine 1 effectively sets the control device to an "off" state so that there is no dimming of the SSL fixture. With static dimming, the control device 10 provides a dimming input signal that controls the SSL fixture to the dimmed state, and no delay timing is involved. The graph in FIG. 10 illustrates an example of static dimming 1000, where an SSL fixture turns "on" at 8 PM under external control, for example, by a photocell or external time clock, and the dimming input signal generated by the control device 10 dims the SSL fixture to 60% brightness and the SSL fixture remains in that state until about 6 AM the next day, when the external control turns the SSL fixture "off". In another example of static dimming, the control device 10 causes the SSL fixture to operate at a continuous dimming level for an indefinite period of time, e.g., at a constant 60% dimming level without regard to the passage of time. As a result, static dimming allows for configuring an SSL fixture's brightness level in a uniform and precise manner.

Figure 11:
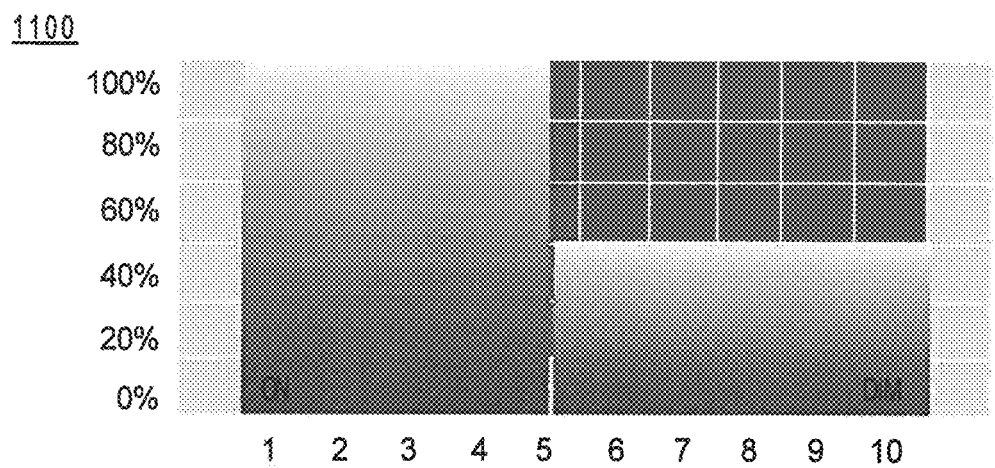

As another example, the control device 10 can provide timed dimming with a fixed time delay if one of routines 3-6, 8-11, or 14-16 are selected. With timed dimming with a fixed time delay, the control device 10 can make an SSL fixture dim once a fixed time has passed after the SSL fixture is turned "on". The graph in FIG. 11 illustrates an example of timed dimming with a fixed time delay 1100, where an SSL fixture turns "on" at time "0" under external control, for example, by an external time clock, at 100% brightness and remains in that state until about time "5". At time "5" the dimming input signal generated by the control device 10 would dim the brightness of the SSL fixture to about 40% until about time "10" at which time the external control turns the SSL fixture "off". However, the different routines provide different delay and brightness options. For example, if routine 10 is selected, the control device 10 will cause an SSL fixture that is "on" at 100% brightness to dim to 40% brightness after about 7 hours at which time the external control turns the SSL fixture "off". It should be noted that when the SSL fixture is powered "off" and then back "on", the control device 10 begins a new cycle. To ensure that the routines activate at the same time each day, the SSL fixture can be connected to a real time clock so that the SSL fixture turns "on" and "off" at about the same time each day, which would cause the control device 10 routines activate at the same time each day.

Figure 12:
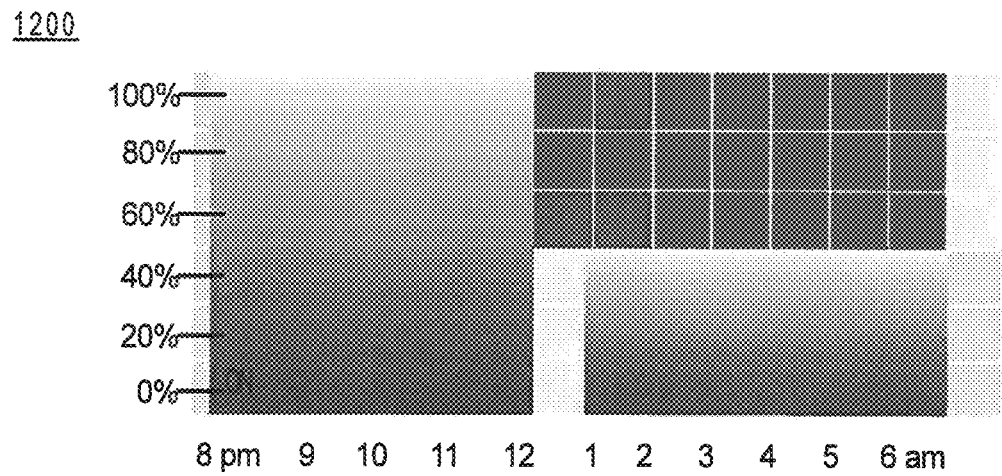

As another example, the control device 10 can provide timed dimming with a variable time delay if one of routines 17-32 are selected. With timed dimming with a variable time delay, the control device 10 can make an SSL fixture dim at approximately the same time each evening when switched by a photo-control or astronomical time clock. The graph in FIG. 12 illustrates an example of timed dimming with a variable time delay 1200, where an SSL fixture turns "on" at 8 PM under external control, for example, by a photocell or external time clock, at a 100% brightness and remains in that state until about 12 AM, which is an estimated midpoint of the length of time that the SSL fixture is to remain on. The controller 40 estimates the midpoint. At 12 AM the dimming input signal generated by the control device 10 would dim the brightness of the SSL fixture to about 40% until about 6 AM at which time the external control turns the SSL fixture "off". However, the different routines provide different time and brightness options. For example, if routine 19 is selected, the control device 10 will cause an SSL fixture that is "on" at 100% brightness, to dim to 20% brightness at approximately 10:00 PM. The control device 10 records how long an SSL fixture is switched on each day, and associates this with the time by assuming midnight to be the midpoint of this interval. This is the basis for calculating the time delay on a day-to-day basis. Due to various factors, such as power interruptions, geographic longitude and daylight savings time, the time estimations may not be exact. To compensate for time estimation anomalies, the control device 10 can be programmed to discard day-length values outside of a reasonable range in instances.

The below table summarizes static dimming, fixed delay dimming and variable delay diming.

| | |
|---|---|
| STATIC DIMMING | SSL fixture maintains constant dimming level, no time delays involved |
| FIXED DELAY | SSL fixture starts at 100%, then dims when a fixed number of hours have elapsed. If the SSL fixture is switched by a time based control, then this option yields a substantially precise dimming time every night. |
| VARIABLE DELAY | SSL fixture starts at 100% (usually) and dims after a certain time which can vary. The control device 10 tries to dim at a specific clock time rather than a simple delay. Since the control device 10 does not typically have a built in clock, it calculates the delay based on a "midnight averaging" technique. This feature is intended to be used with a photocell or astronomical clock control where the SSL fixture is switched "on" and "off" in response to light level or position of the sun. The control device 10 records the number of hours of operation every night, averages over the course of about 3 days, and calculates the correct delay assuming midnight to be the center of the nightly "on" period. This technique approximates a given clock time but can suffer from some inaccuracy due to factors such as daylight savings time and geographic longitude, or even weather altering light levels at dawn and dusk. |

Figure 13:
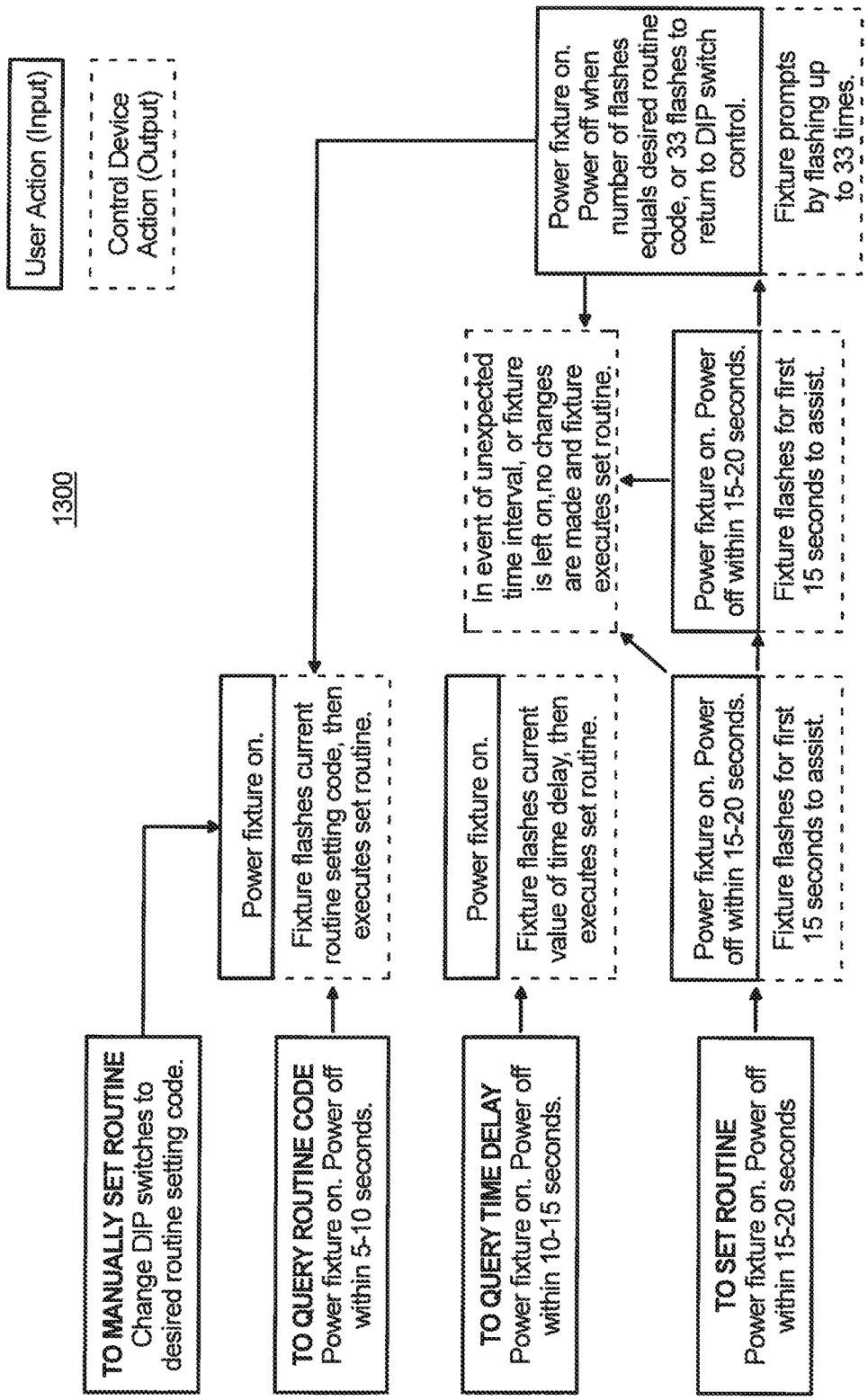
FIG. 13 is an exemplary flow diagram for reprogramming the operation of the control device of FIG. 1.

The control device 10 can be remotely reprogrammed to change the selected function or routine. FIG. 13 provides an exemplary methodology 1300 to reprogram the control device 10. One option is to manually reprogram the control device by changing the settings of the switch assembly 42. To automatically reprogram the control device 10 for any of the 32 routine settings shown in FIG. 9, the first part of the process is to initiate specific on-off cycles in order to reduce the risk of reprogramming the control device 10 by accident. First, with input power to the control device 10 (or SSL fixture) "off", the input power to the control device 10 (or SSL fixture) is turned "on" and then "off" within about 15-20 seconds. Next, the input power to the control device 10 (or SSL fixture) is then turned back "on" and then "off" again after about 15-20 seconds. As a visual aid, the SSL fixture may flash for about 15 seconds. Turning the power to the control device 10 "off" within 5 seconds after the flashing stops completes this cycle. The next step is to turn the control device 10 back "on" and then "off" again after about 15-20 seconds. Again, as a visual aid, the SSL fixture may flash for about 15 seconds. Turning the control device 10 off within about 5 seconds after flashing stops completes the initialization process.

With the initialization process completed, the control device 10 is then turned back "on". The SSL fixture will flash up to 33 times at a slower rate. To set the new routine, the user then turns the control device (or SSL fixture) "off" once the number of flashes equals the desired routine setting code. For example, turning the fixture off at the 15$^{th}$ flash will cause the control device 10 to be programmed to routine 15, seen in FIG. 9. Also, note that setting to 33 (i.e., turning the control device 10 "off" at or after 33$^{rd}$ flash) returns control of the control device back to the switch assembly 42 setting. If the control device 10 is not turned "off" within a few seconds after the 33rd flash, no change to the programming of the control device will be affected. Once the control device 10 has been reprogrammed, then turn the control device 10 (or SSL fixture) "on". The SSL fixture will flash to confirm numerically the newly set routine code, and then within a few seconds the control device will assume normal execution of the newly set routine.

The control device 10 can include remote diagnosis. More specifically, the control device 10 provides for "remote" user interaction via a user cycling power to the SSL fixture in specific intervals as input, and the control device flashes the SSL fixture as output. In addition to allowing for setting changes, this interaction can prompt the control device 10 to "flash" out diagnostic information including the current setting code and time delay. The setting code is also flashed automatically subsequent to its being changed. The below table provides exemplary diagnostic functions that can be remotely activated by a user.

| | |
|---|---|
| CONFIRM OPERATION (AUTOMATIC) | Each time an SSL fixture enabled by the control device 10 is powered up (i.e., turned "on"), the brightness will dwell at about 10% for about two seconds, prior to executing the set routine (at which time a change in brightness will be evident). This behavior confirms that control device is properly connected and operating. |
| CONFIRM CHANGE OF SWITCH SETTINGS (AUTOMATIC) | If the switch settings of control device 10 are altered, upon the next power-up of the SSL fixture, the SSL fixture will flash the routine setting code for the new switch setting selection and execute the new routine a few seconds later. The output of the SSL fixture will be two series of flashes separated by a pause to indicate the routine setting code. As an example, two flashes, followed by a pause, then ten flashes, indicates routine 20 is the routine the control device is set to. Zero is expressed by ten flashes. It should be noted that the change in the physical switch setting would override any previous remotely-programmed routine setting of the control device 10. |
| QUERY ROUTINE SETTING CODE | Perform the following steps to remotely query the rcontrol device's outine setting code. Turn the SSL fixture "off", turn the SSL fixture back "on", and turn the SSL fixture "off" within 5-10 seconds. When the fixture is again turned "on", it will flash the routine setting code (see above section) and after a few seconds will execute the set routine. |
| QUERY TIME DELAY | Perform the following steps to remotely query the control device's current time delay, which may vary from day to day if a variable delay routine has been selected. Turn the SSL fixture "off", turn the SSL fixture back "on", and turn the SSL fixture "off" within 10-15 seconds. When the SSL fixture is again turned "on", the SSL fixture will flash the time delay in minutes, then after a few seconds will execute the set routine. For example, one flash, | followed by a pause, then eight flashes, another pause, then ten flashes indicates 180 minutes (3 hours). Again zero is represented by 10 flashes. It should be noted that a static dimming routine returns a set number of flashes, e.g., 10 flashes (to indicate zero minutes).

Figure 14:
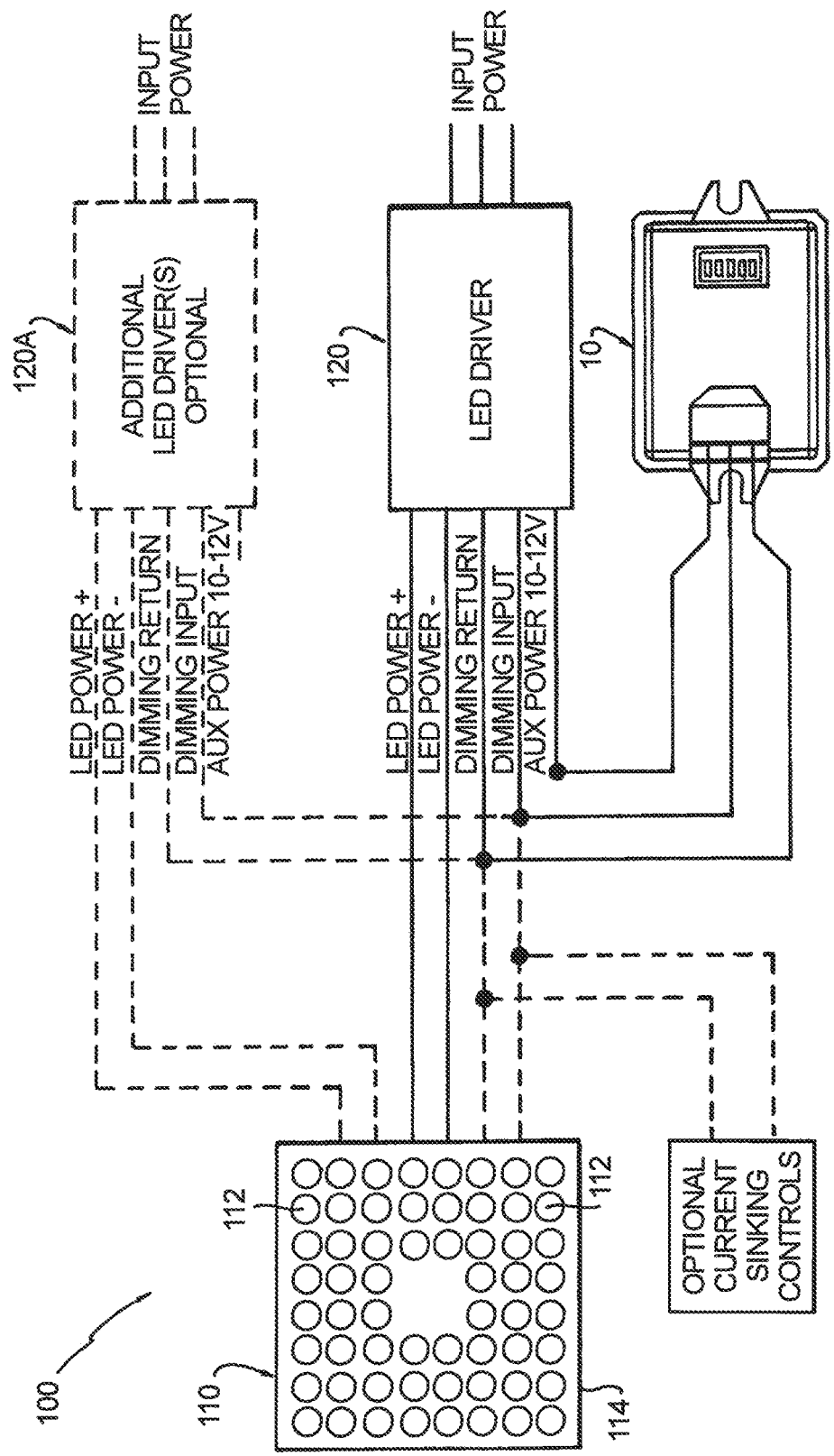
FIG. 14 is a wiring diagram of an embodiment of a solid state light fixture implementing the control device of FIG. 1.

Referring to FIG. 14, an exemplary SSL fixture 100 according to the present disclosure is provided. In this exemplary embodiment, the SSL fixture 100 includes a control device 10, an SSL light engine 110 and an SSL driver 120. Additional SSL drivers 120A may be added to the SSL fixture 100 depending upon the size and requirements of the SSL light engine 110. In addition, optional current sinking controls 130 may be added to the SSL fixture 100 for the purpose of, for example, reducing the dimming level due to excessive temperature, motion detection, or providing an adjustable dimming control. In such a case, the driver will generally follow the lower dimming signal of either control device.

For the ease of description and as an example, the SSL light engine 110 is described as an LED light engine, and the SSL driver 120 is described as an LED driver. The LED light engine 110 has one or more SSL elements 112 used to illuminate a desired area. The SSL elements 112 may include any solid state lighting element, such as an LED lighting element. Preferably, the LED light engine 110 includes a plurality of SSL elements 112 mounted to a printed circuit board 114. A plurality of SSL element lenses (not shown) may be positioned over each SSL element 112, where one SSL element lens is positioned over an SSL element 112. The LED light engine 110 illuminates when energized by the LED driver 120 via the LED Power⁺ and the LED Power⁻ connections. The LED light engine can be dimmed or brightened depending upon the voltage applied to the dimming input of the LED driver 120 via the control device 10, as described above. An example of a suitable driver is the PLED150W-042-C3500-D3 driver manufactured by Thomas Research Products.

It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A control device for dimming SSL light fixtures, the control device comprising:
    a housing having a switch assembly window providing access to a plurality of DIP switches in an interior of the housing, wherein a combination of settings of the plurality of DIP switches select a programmed function designating a brightness percentage setting, and at least one of a fixed delay dimming and a variable delay dimming;
    a programmable controller within the housing, the controller having at least one connection point for external electrical connection and a switch assembly accessible through the switch assembly window; and
    wherein the programmable controller generates one or more dimming signals defining a programmed function capable of controlling an SSL driver and the programmable controller is connected to at least one of a photocell, an external clock and a real time clock for controlling at least in part the dimming SSL light fixtures.

2. The control device of claim 1, wherein the programmable controller comprises a connector for electrically connecting the programmable controller to an SSL driver.

3. The control device of claim 1, wherein the programmable controller comprises a switch assembly selecting a programmed function.

4. The control device of claim 1, wherein the programmable function includes a brightness percentage setting.

5. The control device of claim 1, wherein the programmable function includes a delay time setting in hours.

6. The control device of claim 1, wherein the programmable function includes a variable time delay setting.

7. The control device of claim 1, wherein the programmable function causes the SSL driver to set brightness at a multiple of 20% of a specified maximum brightness.

8. An SSL light fixture for illuminating a desired area comprising:
    an SSL light engine having one or more SSL elements configured to illuminate a desired area;
    a control device having:
        a housing having a switch assembly window providing access to a plurality of DIP switches in an interior of the housing, wherein a combination of settings of the plurality of DIP switches select a programmed function designating a brightness percentage setting, and at least one of a fixed delay dimming and a variable delay dimming;
        a programmable controller within the housing, the controller having at least one connection point for external electrical connection and a switch assembly accessible through the switch assembly window;
        wherein the programmable controller generates one or more dimming signals defining a programmed function capable of controlling an SSL driver and the programmable controller is connected to at least one of a photocell, an external clock and a real time clock for controlling at least in part the SSL light engine; and
    an SSL driver for supplying power to the SSL light engine and the control device and for receiving from the control device the one or more dimming signals that controls illumination of the SSL light engine.

9. The SSL light fixture of claim 8, wherein the programmable controller comprises a connector for electrically connecting the programmable controller to an SSL driver.

10. The SSL light fixture of claim 8, wherein the programmable controller comprises a switch assembly selecting a programmed function.

11. The SSL light fixture of claim 10, wherein the programmable function includes a brightness percentage setting.

12. The SSL light fixture of claim 10, wherein the programmable function includes a delay time setting in hours.

13. The SSL light fixture of claim 10, wherein the programmable function includes a variable time delay setting.

14. The SSL light fixture of claim 10, wherein the programmable function includes causes the SSL driver to set brightness at a multiple of 20% of a specified brightness comprises a connector for electrically connecting the programmable controller to an SSL driver.

15. A control device for dimming SSL light fixtures, the control device comprising:

a housing having a switch assembly window providing access to a plurality of DIP switches in an interior of the housing, wherein a combination of settings of the plurality of DIP switches select a programmed function designating a brightness percentage setting, and at least one of a fixed delay dimming and a variable delay dimming; and a programmable controller within the housing, the controller having at least one connection point for external electrical connection and a switch assembly accessible through the switch assembly window, wherein the programmable controller generates one or more dimming signals defining a programmed function capable of controlling an SSL driver and the programmable controller is connected to at least one of a photocell, an external clock and a real time clock for controlling at least in part the dimming SSL light fixtures, and wherein the programmable controller contains at least a first programmable function for static dimming, a second programmable function for fixed delay dimming and a third programmable function for variable delay diming.

16. The control device of claim 15 wherein the programmable function is modifiable.

* * * * *